United States Patent
Tracy et al.

(10) Patent No.: US 7,903,418 B2
(45) Date of Patent: Mar. 8, 2011

(54) THERMAL MITIGATION DEVICE AND METHOD

(75) Inventors: Mark S Tracy, Tomball, TX (US); Jeffrey A Lev, Tomball, TX (US); Chao-Wen Cheng, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 49 days.

(21) Appl. No.: 12/427,487

(22) Filed: Apr. 21, 2009

(65) Prior Publication Data

US 2010/0265662 A1 Oct. 21, 2010

(51) Int. Cl.
*H05K 7/20* (2006.01)
*G06F 1/20* (2006.01)

(52) U.S. Cl. ............ 361/714; 361/679.54; 361/679.55; 361/704; 165/80.2; 165/185; 174/547

(58) Field of Classification Search . 361/679.31–679.32, 679.46, 679.54–679.55, 361/688, 704, 714–715, 800, 816, 818; 165/80.2–80.3, 185; 174/520, 547–548
See application file for complete search history.

(56) References Cited

U.S. PATENT DOCUMENTS

| | | | | |
|---|---|---|---|---|
| 3,427,706 A | | 2/1969 | Jaffee | |
| 5,049,728 A | * | 9/1991 | Rovin | 235/492 |
| 5,673,174 A | * | 9/1997 | Hamirani | 361/679.32 |
| 5,969,940 A | * | 10/1999 | Sano et al. | 361/679.52 |
| 6,002,587 A | * | 12/1999 | Shusa et al. | 361/704 |
| 6,075,701 A | | 6/2000 | Ali et al. | |
| 6,115,243 A | * | 9/2000 | Horii | 361/679.09 |
| 6,147,301 A | | 11/2000 | Bhatia | |
| 6,157,538 A | * | 12/2000 | Ali et al. | 361/704 |
| 6,233,158 B1 | * | 5/2001 | Leman | 361/799 |
| 6,365,076 B1 | | 4/2002 | Bhatia | |
| 6,374,328 B1 | * | 4/2002 | Rhinehart | 711/115 |
| 6,469,912 B1 | * | 10/2002 | Chuang | 361/816 |
| 6,514,616 B1 | | 2/2003 | Gandi et al. | |
| 6,569,380 B2 | | 5/2003 | Lim et al. | |
| 6,618,245 B2 | * | 9/2003 | Diaz | 361/679.33 |
| 6,728,105 B2 | * | 4/2004 | Tanaka | 361/704 |
| 6,735,079 B2 | * | 5/2004 | Huang | 361/695 |
| 6,777,086 B2 | * | 8/2004 | Norley et al. | 428/408 |
| 6,831,835 B2 | | 12/2004 | Soto | |
| 7,059,693 B2 | * | 6/2006 | Park | 312/405.1 |
| 7,184,278 B2 | * | 2/2007 | Tsai | 361/816 |
| 7,311,140 B2 | | 12/2007 | McCullough | |
| 7,393,587 B2 | | 7/2008 | Krassowski et al. | |
| 7,420,815 B2 | * | 9/2008 | Love | 361/752 |
| 7,580,270 B2 | * | 8/2009 | Iikubo et al. | 361/818 |
| 7,663,881 B2 | * | 2/2010 | Kuo | 361/692 |
| 7,701,724 B2 | * | 4/2010 | Tanaka et al. | 361/752 |
| 2007/0177345 A1 | * | 8/2007 | Iikubo et al. | 361/683 |
| 2008/0057265 A1 | | 3/2008 | Liang et al. | |
| 2008/0112129 A1 | * | 5/2008 | Kuo | 361/687 |
| 2009/0097197 A1 | * | 4/2009 | Chen | 361/679.46 |
| 2009/0147494 A1 | * | 6/2009 | Iida et al. | 361/818 |

* cited by examiner

*Primary Examiner* — Robert J Hoffberg
(74) *Attorney, Agent, or Firm* — Michael S. Czarnecki

(57) ABSTRACT

An exemplary thermal protection system includes a body having a first surface, at least one stationary thermal member disposed at least partially proximate the first surface and at least one heat producing device. An aperture, defined by at least one exterior edge can penetrate both the body and the stationary thermal member. At least a portion of the heat producing device can be disposed proximate the aperture. A moveable thermal member translatable between a first position and a second position, can be disposed proximate the stationary thermal member, the aperture, and the heat producing device when in the first position. When in the first position, a first portion of the moveable thermal member can overlap at least a portion of the stationary thermal member. When in the second position, the moveable thermal member can be disposed distal to the aperture and the at least one heat producing device.

19 Claims, 3 Drawing Sheets

THERMAL MITIGATION DEVICE AND METHOD

BACKGROUND OF THE INVENTION

Description of the Related Art

This section is intended to introduce the reader to various aspects of art which may be related to one or more aspects of the present invention as described and claimed below. This discussion is believed helpful in providing the reader with background information, thereby facilitating a better understanding of various aspects of the present invention. Accordingly, it should be understood by the reader that the provided information should be read in this light and not as an admission of any prior art.

At least a portion of the ever increasing power consumption of portable electronic devices is manifested as a thermal byproduct, i.e. heat. Given the ever decreasing enclosure size housing such portable electronic devices, the heat generated cannot be dissipated within the housing, and instead is transmitted through the walls of the surrounding enclosure. Where the portable electronic device has high intensity/high temperature heat producing components, the wall temperature of the surrounding enclosure can rapidly reach levels that are uncomfortable, or even dangerous, for human contact. To mitigate this possibility, thermal shields made of a thermally conductive material may be disposed within the enclosure to partially or completely block, mitigate and/or otherwise disperse the heat transmitted to the enclosure. The ability to block or otherwise mitigate the heat transmitted to the enclosure is dependent, among other things, upon the physical integrity of the thermal shield. Continuous thermal shields, for example thermal shields having no apertures disposed therethrough, provide superior thermal mitigation performance compared to thermal shields having one or more apertures disposed therethrough. Unfortunately, batteries and user replaceable or repairable components in modern portable electronic devices frequently require numerous apertures be disposed about the enclosure and any thermal shield disposed therein.

SUMMARY OF THE INVENTION

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

A thermal protection system is provided. The thermal protection system can include a body having a first surface, at least one stationary thermal member disposed at least partially proximate the first surface and at least one heat producing device. An aperture, defined by at least one exterior edge can penetrate both the body and the stationary thermal member. At least a portion of the heat producing device can be disposed proximate the aperture. A moveable thermal member translatable between a first position and a second position, can be disposed proximate the stationary thermal member, the aperture, and the heat producing device when in the first position. When in the first position, a first portion of the moveable thermal member can overlap at least a portion of the stationary thermal member. When in the second position, the moveable thermal member can be disposed distal to the aperture and the at least one heat producing device.

Another thermal protection system is also provided. The thermal protection system can include a body having an aperture passing therethrough and having at least one heat producing device proximate the aperture disposed therein. A stationary thermal member can be at least partially disposed proximate the body, the stationary thermal member can have an aperture coincident with the body aperture passing therethrough. A moveable thermal member reversibly translatable between a first position and a second position. When in the first position, the moveable thermal member can be disposed proximate the aperture and the at least one heat producing device. Further, when in the first position, a first portion of the moveable thermal member can overlap the stationary thermal member by at least 25% of the total surface area of the moveable thermal member disposed proximate the stationary thermal member. When in the second position, the moveable thermal member is disposed distal to the aperture and the at least one heat producing device.

A method for thermal protection is also provided. A stationary member can be at least partially disposed proximate a body having a first surface and a second surface, where the stationary thermal member disposed at least partially proximate the first surface. An aperture defined by at least one exterior edge can be formed; the aperture can penetrate both the body and the stationary thermal member in a coincident location. At least one heat producing device can be at least partially disposed within the body, proximate the aperture. A moveable thermal member can be attached to at least a portion of the stationary thermal member; the moveable thermal member reversibly translatable between a first position and a second position. When in the first position, the moveable thermal member can be disposed proximate the aperture and the at least one heat producing device and at least a portion of the stationary thermal member can overlap a first portion of the moveable thermal member. When in the second position, the moveable thermal member is disposed distal to the aperture and the at least one heat producing device. The movable thermal member can be disposed in the first position to disperse heat at least partially through the moveable thermal member and the stationary thermal member. The moveable thermal member can be disposed in the second position to provide access to the at least one heat producing device disposed at least partially within the body.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Advantages of one or more disclosed embodiments may become apparent upon reading the following detailed description and upon reference to the drawings in which.

DETAILED DESCRIPTION

A detailed description will now be provided. Each of the appended claims defines a separate invention, which for infringement purposes is recognized as including equivalents to the various claim elements or limitations. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Figure 1:
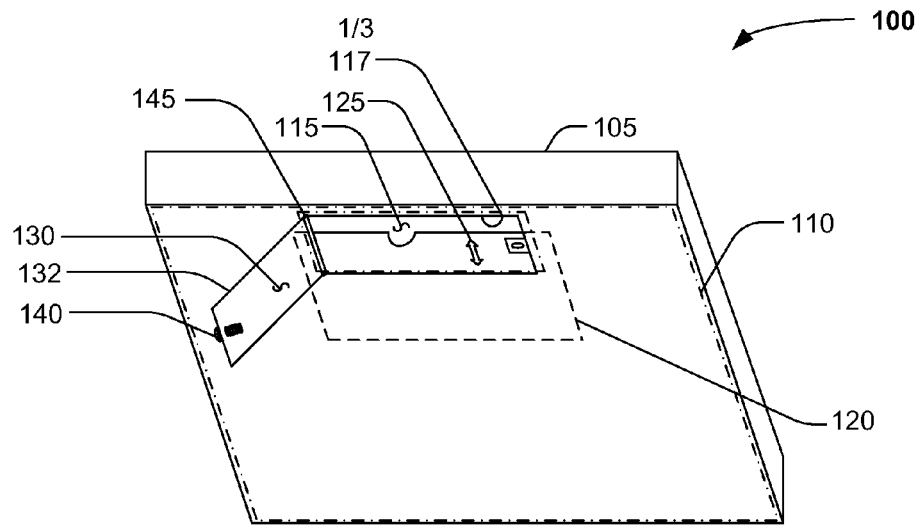
FIG. 1 is an isometric view depicting an illustrative thermal mitigation system, in accordance with one or more embodiments described herein.
Figure 1A:
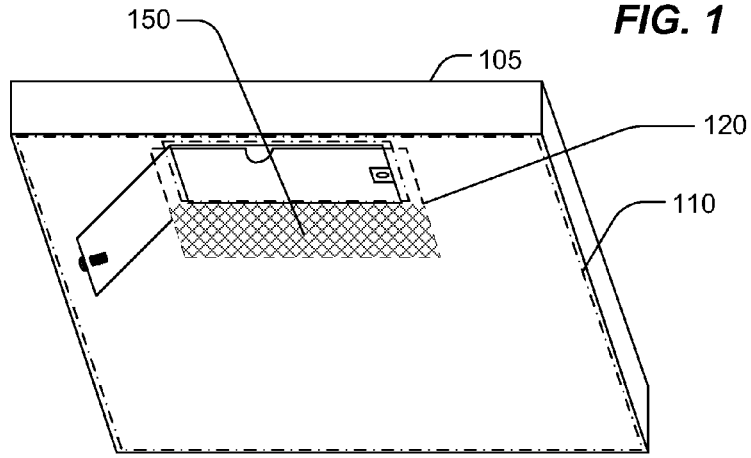
FIG. 1A is an isometric view of the illustrative thermal mitigation system depicted in FIG. 1, having the moveable thermal member disposed in a first position, in accordance with one or more embodiments described herein.
Figure 1B:
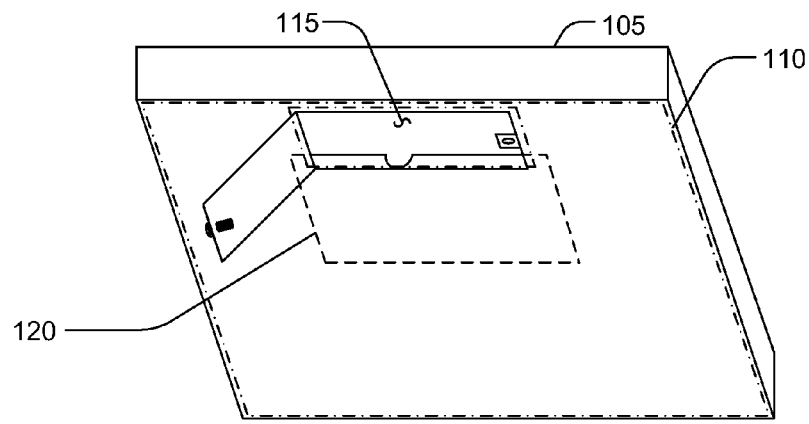
FIG. 1B is an isometric view of the illustrative thermal mitigation system depicted in FIG. 1, having the moveable thermal member disposed in a second position, in accordance with one or more embodiments described herein.

FIG. 1 is an isometric view depicting an illustrative thermal mitigation system 100, in accordance with one or more embodiments. FIG. 1A is an isometric view of the illustrative thermal mitigation system 100 depicted in FIG. 1, having a moveable thermal member 120 disposed in a first position, in accordance with one or more embodiments described. FIG. 1B is an isometric view of the illustrative thermal mitigation system 100 depicted in FIG. 1, having the moveable thermal member 120 disposed in a second position, in accordance with one or more embodiments described.

The thermal mitigation system 100 depicted in FIG. 1 can include a body 105 having an integral or distinct stationary thermal member 110 disposed at least partially therein. An aperture 115, defined by at least one exterior edge 117 can at least partially penetrate the body 105 and the thermal member 110 in coincident locations. A moveable thermal member 120, reversibly translatable 125 between a first position and a second position can be disposed proximate the stationary thermal member and at least partially proximate the aperture 115. A heat producing device (not shown in FIG. 1) can be disposed at least partially within the body 105, and at least partially proximate all or a portion of the aperture 115. A moveable member 130, corresponding in shape, size, or configuration to the aperture 115 can be detachably attached to the body 105 using at least one hinge 145 and fastener 140.

In one or more embodiments, the stationary thermal member 110 can be disposed in, on, or about the body 105. In one or more embodiments, the body 105 can be any member or combination of members suitable for providing a first ("interior") surface and a second ("exterior") surface. In one or more specific embodiments, the body 105 can be a generally rectangular, four-sided, partially or completely open-topped member, for example the base member forming the keyboard portion of a portable computer.

In one or more embodiments, one or more apertures 115 can be disposed in, on, or about the body 105. In one or more specific embodiments, all or a portion of the interior edges 117 defining the one or more apertures 115 can be in substantial alignment with the aperture 115 penetrating the stationary thermal member 110. For example, one or more apertures 115 can be used to provide one or more cooling air inlets, one or more cooling air outlets, one or more battery access ports, one or more device access ports, or any combination thereof. In one or more specific embodiments, at least one of the one or more apertures 115 can provide access to one or more heat generating devices, for example one or more integrated circuit devices such as a central processing unit (CPU), a graphics processing unit (GPU), or a memory module. In one or more specific embodiments, the memory module can include, but are not limited to, a single inline memory module (SIMM), a dual inline memory module (DIMM), a Rambus® memory module (RIMM®), a micro dual inline memory module (MicroDIMM), a small outline dual inline memory module (SO-DIMM), and the like.

The body 105 can be a metallic or non-metallic material. Exemplary suitable non-metallic materials can include, but are not limited to, thermoplastics, carbon fiber, and the like. Exemplary suitable, metallic materials can include, but are not limited to, aluminum and aluminum containing alloys, stainless steel and stainless steel alloys, and the like. In one or more embodiments, the body 105 can be a composite, containing both metallic and non-metallic material, for example a carbon fiber encapsulated steel or aluminum body.

In one or more embodiments, the stationary thermal member 110 can be disposed in, on, or about the body 105. The stationary thermal member 110 can be disposed proximate the interior or exterior surface formed by the body 105. In one or more specific embodiments, the stationary thermal member 110 can be at least partially disposed proximate one or more interior surfaces formed by the body 105. In one or more specific embodiments, at least a portion of the stationary thermal member 110 can be disposed between one or more heat producing devices (not shown in FIG. 1) and the body 105. Disposal of the stationary thermal member 110 between the heat producing device and the body 105 can mitigate or prevent the formation of "hot spots" on the body 105 caused by the operative heat generated by the heat producing device disposed at least partially within the body 105. In one or more specific embodiments, the body 105 can be a generally rectangular, four-sided, partially or completely open-topped member, and the stationary thermal member 110 can be a generally rectangular planar member disposed proximate all or a portion of the "bottom" surface of the body 105.

The terms "top," "bottom," "sides," "upper," "lower," and other like terms used herein refer to relative positions to another and are not intended, nor should be interpreted, to denote a particular absolute direction or spatial orientation. For example, a feature described as being on the "bottom" surface of a device could be on the "top" surface or a "side"

surface of the device if the device is rotated or inverted; such rotation or inversion would not depart from the scope of one or more claimed embodiments described herein.

In one or more embodiments, the stationary thermal member 110 can include, but is not limited to a fabric, a foil, or a sheet. The stationary thermal member 110 can be partially or completely flexible, pliable, rigid, or any combination thereof. In one or more embodiments, the stationary thermal member 110 can be a metallic member, including a film, a foil, a plate, or the like, containing one or more metals or metal alloys, for example copper, copper alloys, aluminum, aluminum alloys, or the like. In one or more embodiments, the stationary thermal member 110 can be a metallic member incorporating one or more metals or metal alloys, having a bulk thermal conductivity in excess of about 200 Watts/meter-Kelvin (W/m-K); in excess of about 250 W/m-K; in excess of about 300 W/m-K; in excess of about 350 W/m-K; in excess of about 400 W/m-K; in excess of about 450 W/m-K; or in excess of about 500 W/m-K. In one or more embodiments, the stationary thermal member 110 can be a metallic member incorporating one or more metals or metal alloys, having an overall thickness of from about 0.01 mm to about 5 mm; from about 0.015 mm to about 3 mm; or from about 0.02 mm to about 1 mm.

In one or more embodiments, the stationary thermal member 110 can include any carbon containing material having a high in-plane thermal conductivity and a comparatively lower through-plane thermal conductivity. In one or more embodiments, the stationary thermal member 110 can include, but is not limited to, one or more pure carbon materials, such as graphite or crystallized carbon. Crystallized carbon can include, but is not limited to crystalline structures such as buckminsterfullerene, in various geometric configurations such as nanotubes or spheres. In one or more embodiments, the stationary thermal member 110 can include, but is not limited to, a substantially planar, carbon-containing, sheet as depicted in FIG. 1. In one or more embodiments, the stationary thermal member 110 can be a carbon containing member incorporating one or more crystalline carbon structures, having an in-plane, i.e. coplanar with the stationary thermal member, thermal conductivity in excess of about 100 W/m-K or more; a minimum of about 150 W/m-K or more; a minimum of about 200 W/m-K or more; or a minimum of about 300 W/m-K or more. In one or more embodiments the through-plane, i.e. normal to the stationary thermal member, thermal conductivity of the stationary thermal member 110 can be a maximum of about 200 W/m-K or less; a maximum of about 100 W/m-K or less; a maximum of about 50 W/m-K or less; or a maximum of about 25 W/m-K or less. In one or more embodiments, the stationary thermal member 110 can be a carbon containing member incorporating one or more carbon plies or sheets, having an overall composite thickness of from about 0.1 mm to about 5 mm; from about 0.15 mm to about 3 mm; or from about 0.2 mm to about 1 mm.

In one or more embodiments, the moveable thermal member 120, can be disposed proximate the stationary thermal member and at least partially proximate the aperture 115. In one or more specific embodiments, the moveable thermal member 120 can be reversibly translatable 125 between a first position (as depicted in FIG. 1A) and a second position (as depicted in FIG. 1B). In one or more embodiments, when the moveable thermal member 120 is disposed in the first ("closed") position, the moveable thermal member 120 can be disposed proximate the aperture 115 and the at least one heat producing device disposed proximate the aperture 115. Although the moveable thermal member is depicted as being disposed proximate the upper surface of the stationary thermal member 110 in FIG. 1, the moveable thermal member 120 can be disposed on the lower surface of the stationary thermal member 110 without departing from one or more claimed embodiments described herein.

In one or more embodiments, when in the first position, the moveable thermal member can cover or otherwise block all, or substantially all, of the aperture 115 as depicted in FIG. 1A. By blocking the all, or substantially all, of the aperture 115, the stationary thermal member 110 and the moveable thermal member 120 can provide a partial or complete near-uniform thermal shield across all or a portion of the body 105. Such a thermal shield can provide a near or substantially near uniform distribution of heat across one or more surfaces forming the body 105, where one or more heat generating devices are disposed within the body 105.

The moveable thermal member 120 can have any physical size, shape, geometry, or configuration. In one or more specific embodiments, the moveable thermal member 120 can be a substantially planar member having an area substantially the same as the area of the aperture 115. In one or more embodiments, the area of the moveable thermal member 120 can be greater than the area of the aperture 115. In one or more embodiments, about 10% or more; about 20% or more; about 30% or more; about 40% or more; or about 50% or more of the surface area of the moveable thermal member 120 can overlap 150 the stationary thermal member when the moveable thermal member is disposed in the first, closed, position. In one or more embodiments, by providing an overlap 150 between the moveable thermal member 120 and the stationary thermal member 110, heat transfer, and consequently heat distribution, between the moveable thermal member 120 and the stationary member 110 can be enhanced, thereby providing a more uniform heat distribution across one or more surfaces of the body 105 proximate the stationary and moveable thermal members 110, 120; for example, the bottom of the body 105 as depicted in FIG. 1.

In one or more embodiments, the moveable thermal member 120 can be continuously translated 125 between the first, closed, position, and a second, open, position. In one or more embodiments, the moveable thermal member 120 can be detachably attached to the stationary thermal member 110 using one or more slides, one or more pivotable fasteners, one or more lock and loop fasteners When in the second position, the moveable thermal member can be disposed distal from the aperture 115, thereby providing an open, or substantially open, pathway through the aperture 115 as depicted in FIG. 1B. Such a pathway can be used, for example, for accessing all or a portion of the one or more heat producing devices disposed at least partially within the body 105.

As used herein, the terms "translate," "translated," and "translatable," "continuously translated," and "continuously translatable" refer to the ability to smoothly move a member between a first position and a second position while having the ability to stop the movement of the member at any intermediate point existent between the first position and the second position.

In one or more embodiments, the moveable thermal member 120 can include, but is not limited to a fabric, a foil, or a sheet. The moveable thermal member 120 can be partially or completely flexible, pliable, rigid, or any combination thereof. In one or more embodiments, the moveable thermal member 120 can be a metallic member, including a film, a foil, a plate, or the like, containing one or more metals or metal alloys. In one or more embodiments, the moveable thermal member 120 can be a metallic member incorporating one or more metals or metal alloys, having a bulk thermal conductivity in excess of about 200 Watts/meter-Kelvin (W/m-K); in excess of about 250 Watts/meter-Kelvin (W/m-K); in excess of about 300 Watts/meter-Kelvin (W/m-K); in excess of about 350 Watts/meter-Kelvin (W/m-K); in excess of about 400 Watts/meter-Kelvin (W/m-K); in excess of about 450 Watts/meter-Kelvin (W/m-K); or in excess of about 500 Watts/meter-Kelvin (W/m-K). In one or more embodiments, the stationary thermal member 110 can be a metallic member incorporating one or more metals or metal alloys, having an overall thickness of from about 0.05 mm to about 5 mm; from about 0.075 mm to about 4 mm; or from about 0.10 mm to about 3 mm.

In one or more embodiments, the moveable thermal member 120 can include any carbon containing material having a high in-plane thermal conductivity and a relatively lower through-plane thermal conductivity. In one or more embodiments, the moveable thermal member 120 can include, but is not limited to, one or more pure carbon materials, such as graphite or crystallized carbon. Crystallized carbon can include, but is not limited to crystalline structures such as buckminsterfullerene, in various geometric configurations such as nanotubes or spheres. In one or more embodiments, the moveable thermal member 120 can include, but is not limited to, a substantially planar, generally-rectangular, carbon-containing, sheet as depicted in FIG. 1. In one or more embodiments, the moveable thermal member 120 can be a carbon-containing member incorporating one or more crystalline carbon structures, having an in-plane, i.e. coplanar with the stationary thermal member, thermal conductivity in excess of about 100 W/m-K or more; a minimum of about 150 W/m-K or more; a minimum of about 200 W/m-K or more; or a minimum of about 300 W/m-K or more. In one or more embodiments, the through-plane, i.e. normal to the stationary thermal member, thermal conductivity of the stationary thermal member 110 can be a maximum of about 200 W/m-K or less; a maximum of about 100 W/m-K or less; a maximum of about 50 W/m-K or less; or a maximum of about 25 W/m-K or less. In one or more embodiments, the stationary thermal member 110 can be a carbon-containing member incorporating one or more carbon plies or sheets, having an overall composite thickness of from about 0.1 mm to about 7 mm; from about 0.15 mm to about 5 mm; or from about 0.2 mm to about 3 mm.

In one or more embodiments, all or a portion of the moveable member 130 can be disposed proximate the aperture 115. In one or more embodiments, one or more external edges 132 can form the perimeter of the moveable member 130. In one or more specific embodiments, the moveable member 130 can correspond to the approximate size and shape of the aperture 115. In one or more embodiments, the one or more external edges 132 forming the perimeter of the moveable member 130 can correspond to the at least one external edge 117 forming the perimeter of the aperture 115.

In one or more embodiments, the moveable member 130 can be detachably attached to the body using one or more hinges, tabs, slots, or the like. In one or more specific embodiments, the moveable member 130 can be pivotably attached to the body 105 using one or more hinges 145 disposed along all or a portion of the one or more external edges 132. In one or more embodiments, the moveable member 130 can be detachably attached to the body 105 using one or more fasteners 140. Any type of fastener 140 can be used to detachably attach the moveable member 130 to the body 105, typical, non-limiting examples of suitable fasteners include slide latches, threaded fasteners (screws, bolts, and the like), quarter turn fasteners, quick release fasteners, hook-and-loop (e.g., Velcro®) fasteners, or the like.

In one or more embodiments, the moveable member 130 can be detachably affixed or secured to the body 105, covering all or a portion of the aperture 115 using one or more fasteners 140. Although an exemplary threaded fastener 140 is depicted in FIG. 1, the one or more fasteners 140 can also include, but are not limited to, one or more mating tabs, slots, fixtures, recesses, snaps, locks, loops, or appliances employed alone or in any combination and/or frequency disposed in, on, or about the body 105.

Figure 2:
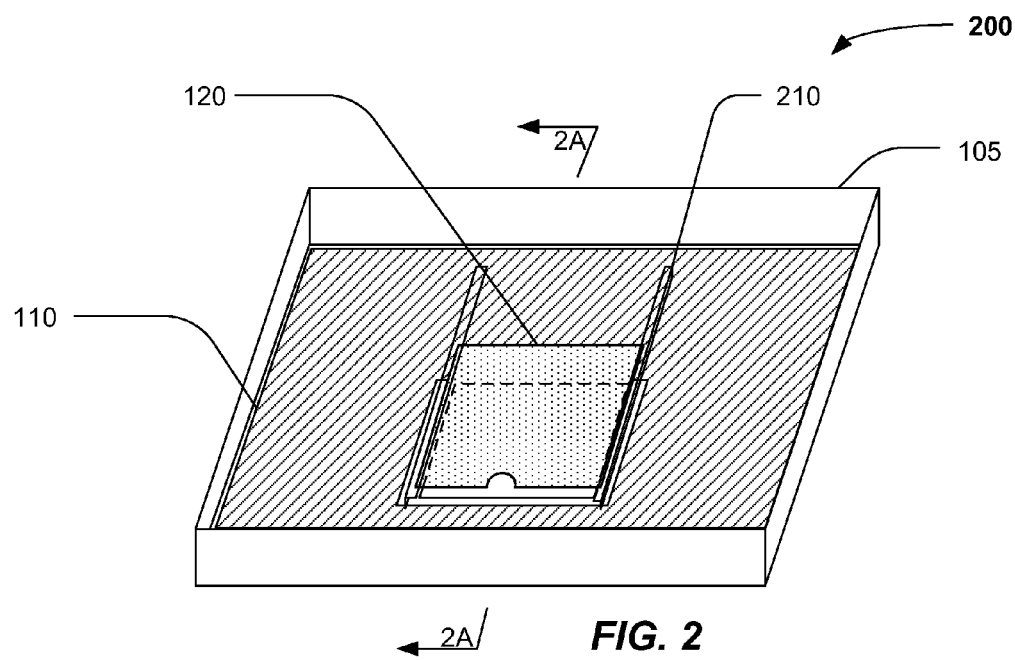
FIG. 2 is an isometric view of another illustrative thermal mitigation system depicting the moveable thermal member in the first position, in accordance with one or more embodiments described herein.
Figure 2A:
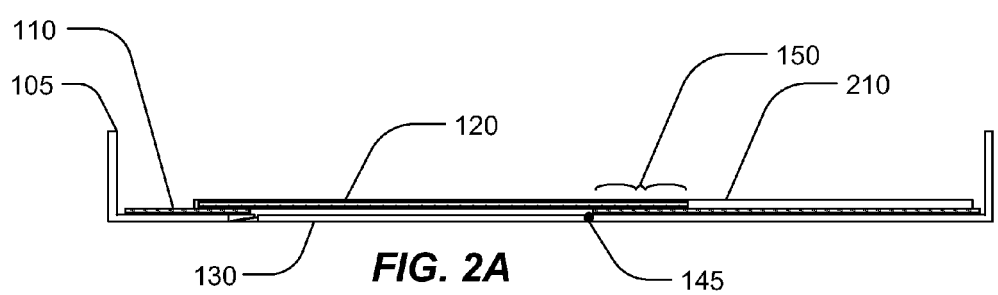
FIG. 2A is a sectional view of the illustrative thermal mitigation system depicted in FIG. 2 along line 2A-2A, according to one or more embodiments described herein.

FIG. 2 is an isometric view of another illustrative thermal mitigation system 200 depicting the moveable thermal member 120 in the first position, in accordance with one or more embodiments described. FIG. 2A is a sectional view of the illustrative thermal mitigation system 200 depicted in FIG. 2 along line 2A-2A, according to one or more embodiments described. In one or more embodiments, the moveable thermal member 120 can be disposed proximate to a surface of the stationary thermal member 110, for example the upper surface of the stationary thermal member 110 as depicted in FIG. 2. As depicted in FIGS. 2 and 2A, the moveable thermal member 120 is disposed in the first position, where all, or substantially all, of the aperture 115 is covered or otherwise intruded upon by the moveable thermal member.

In one or more embodiments, one or more slides, channels, grooves, or conduits 210 can be disposed about one or more external edges of the moveable thermal member 120 to slideably connect the moveable thermal member 120 to the stationary thermal member 110, to the base 105, or to both the stationary thermal member 110 and the base 105. In one or more embodiments, one or more rivets, pins, bolts, or screws can be used to pivotably connect the moveable thermal member 120 to the stationary thermal member 110, to the base 105, or to both the stationary thermal member 110 and the base 105. In one or more embodiments, one or more pressure-sensitive or pressure activated fasteners, such as one or more snap fasteners, one or more hook-and-loop fasteners, can be used to detachably connect the moveable thermal member 120 to the stationary thermal member 110, to the base 105, or to both the stationary thermal member 110 and the base 105.

In one or more embodiments, the moveable thermal member 120 can be frictionally held in position via friction exerted on the moveable thermal member by the previously described slideable, pivotable, or detachable fasteners. For example, friction between the moveable thermal member 120 and the one or more guides 210 as depicted in FIGS. 2 and 2A can prevent the moveable thermal member 120 from sliding between the first position and the second position as the base 105 is tilted or otherwise moved.

The moveable member 130 can be disposed proximate the aperture 115 as depicted in FIGS. 2 and 2A. When the moveable member 130 is disposed proximate the aperture 115, the one or more fasteners 140 can be used to hold the moveable member within the aperture 115.

In one or more embodiments, all or a portion of the one or more guides 210 can be disposed in, on, or about the stationary thermal member 110. In one or more embodiments, all or a portion of the one or more guides 210 can be disposed in, on, or about the body 105. In one or more specific embodiments, the one or more guides can be permanently attached to the stationary thermal member 110 by screwing, welding, brazing, or by integral formation with the stationary thermal member 110, as depicted in FIG. 2. In one or more embodiments, the one or more guides can be a material having a low thermal conductivity, i.e. an insulator. In one or more embodiments, the one or more guides 210 can be identical in composition to the stationary thermal member 110. In one or more embodiments, the one or more guides can be identical in composition to the moveable thermal member 120.

Figure 3:
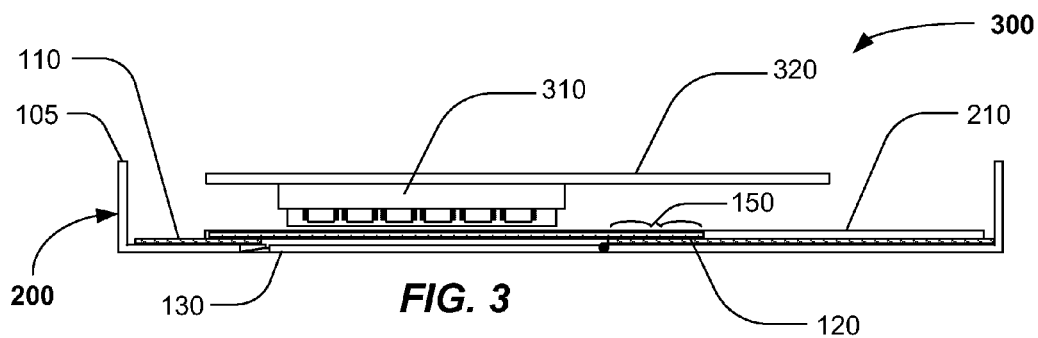
FIG. 3 is a sectional view of the illustrative thermal mitigation system depicted in FIG. 2, having an illustrative heat producing device disposed therein, according to one or more embodiments described herein.

FIG. 3 is a sectional view of the illustrative thermal mitigation system 300, having an illustrative heat producing device 310 disposed therein, according to one or more embodiments described. In one or more embodiments, the heat producing device 310 can be disposed partially or completely within the base 105. In one or more embodiments, the heat producing device 310 can be partially or completely disposed proximate the aperture 115 disposed in the base 105 and the stationary thermal member 110. By disposing the heat producing device 310 proximate the aperture 115, a user can access the heat producing device via the aperture 115.

In one or more specific embodiments, the heat producing device 310 can be disposed proximate the aperture 115, thus the heat producing device 310 can also be proximate the moveable thermal member 120 when in the first, closed, position. In one or more embodiments, when the heat producing device is disposed proximate the aperture 115 and the moveable thermal member 120 is disposed in the first position as depicted in FIG. 3, all or a portion of the heat radiated by the heat producing device 310 can be absorbed by the moveable thermal member 120. In one or more embodiments, all or a portion of the heat transferred from the heat producing device 310 to the moveable thermal member 120 can travel or be otherwise transmitted through the moveable thermal member 120. In one or more embodiments, all or a portion of the heat transmitted through the moveable thermal member 120 can be transmitted or otherwise transferred to the stationary thermal member 110 via the overlap area 150 existing between the moveable and stationary thermal members. Heat transfer between the moveable and stationary thermal member can assist in minimizing the heat buildup within the moveable thermal member 120 and minimize the resultant convective heat transferred from the moveable thermal member 120 to the body 105 and/or moveable member 130.

In one or more embodiments, the heat producing device 310 can be any device capable of producing heat as either a product or byproduct of operation. Exemplary heat producing devices 310 typically encountered in portable electronics can include computing device components, for example central processing units (CPUs); graphical processing units (GPUs); memory modules; solid state drives (SSDs); hard disk drives (HDDs); power supplies; display illumination devices such as light bulbs and LEDs; and the like. In one or more embodiments, the one or more heat producing devices 310 can be mounted in a slot, socket, or other receptacle disposed in, on, or about a circuit board 320. In one or more embodiments, all or a portion of the heat producing devices 310 can include devices adapted for user replacement or upgrade. For example, in one or more embodiments, the one or more heat producing devices 310 can include one or more user-upgradeable, slot-mounted, DIMM memory modules.

In one or more specific embodiments, the one or more heat producing devices 310 can form all or a portion of a computing device. For example one or more heat producing devices can be used to provide all or a portion of a portable computer, a handheld gaming system, a cellular communication device, a personal digital assistant (PDA), or the like. In one or more specific embodiments, the body 105 can be the base portion of a portable computing device, for example a laptop or ultraportable computer, housing a CPU, GPU, memory module, HDD, SSD, battery, or the like. The stationary thermal member 110 can be a metal foil or film disposed within the base 105 of the portable computing device to provide reasonably uniform heat dispersion across one or more surfaces forming the base 105. The moveable thermal member 120 can be a carbon or graphite based member having a relatively high in-plane thermal conductivity and a relatively low through-plane thermal conductivity disposed between one or more of the heat producing devices 310 and a moveable member 130. The moveable member 130 can be disposed on a surface of the base 105, to provide user access to the one or more heat producing devices partially or completely disposed within the base 105.

Figure 4:
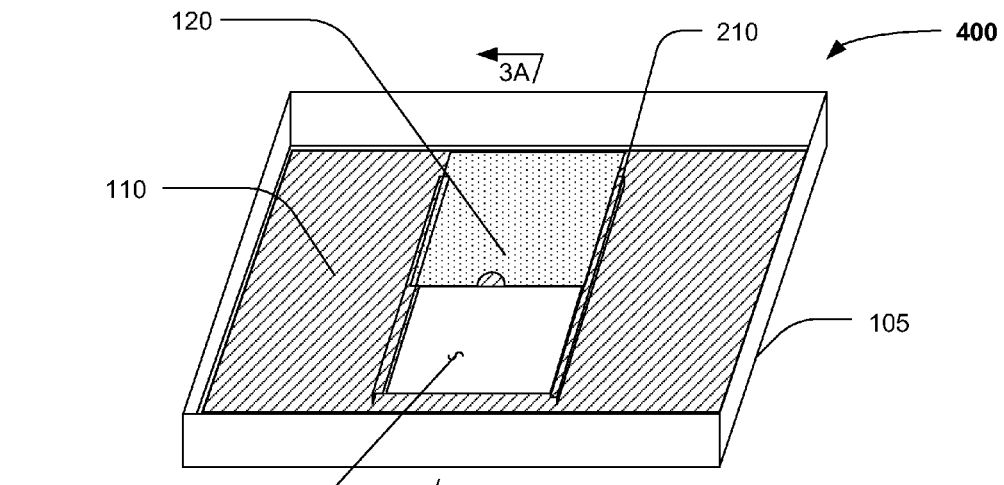
FIG. 4 is an isometric view of yet another illustrative thermal mitigation system, depicting the moveable thermal member in the second position in accordance with one or more embodiments described herein.
Figure 4A:
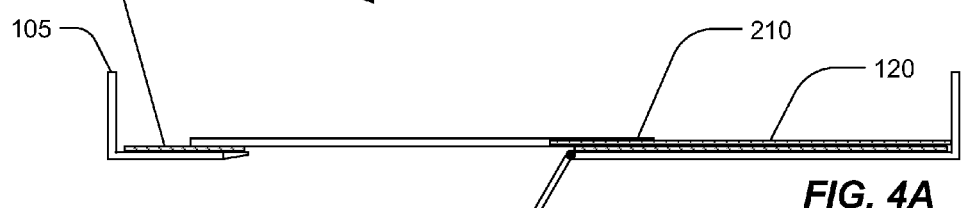
FIG. 4A is a sectional view of the illustrative thermal mitigation system depicted in FIG. 4 along line 4A-4A, according to one or more embodiments described herein.

FIG. 4 is an isometric view of yet another illustrative thermal mitigation system 400, depicting the moveable thermal member 120 disposed in the second position in accordance with one or more embodiments described. FIG. 4A is a sectional view of the illustrative thermal mitigation system depicted in FIG. 4 along line 4A-4A, according to one or more embodiments described. In one or more embodiments, a user can access the moveable thermal member 120 through the aperture 115.

In one or more embodiments, a user can pivot or otherwise translate the moveable member 130 about one or more hinges 145 to an open position, distal from the aperture 115, as depicted in FIGS. 4 and 4A. In one or more embodiments, after pivoting the moveable member 130 about the one or more hinges 145 to an open position, the user can access the moveable thermal member 120 disposed in the first, closed, position, proximate the aperture 115.

In one or more embodiments, after pivoting the moveable member 130 about the hinge 145, the user can translate or otherwise displace the moveable thermal member 120 to the second, open, position depicted in FIGS. 4 and 4A. By disposing the moveable thermal member 120 in the second position, all, or substantially all, of the aperture 115 can be opened as depicted in FIGS. 4 and 4A, thereby providing access to the body 105.

Figure 5:
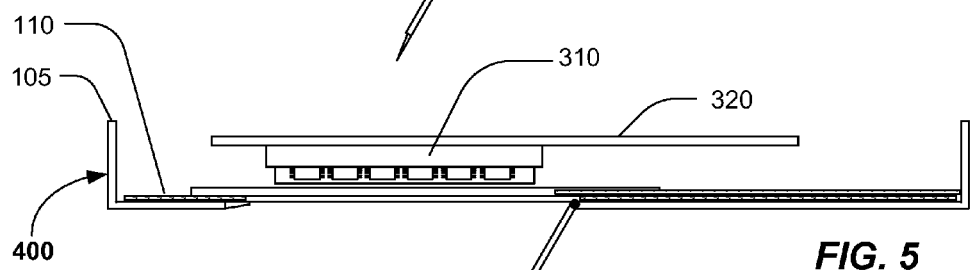
FIG. 5 is a sectional view of the illustrative thermal mitigation system depicted in FIG. 4, having an illustrative heat producing device disposed therein, according to one or more embodiments described herein.

FIG. 5 is a sectional view of the illustrative thermal mitigation system 400, having an illustrative heat producing device 310 disposed therein, according to one or more embodiments described. In one or more embodiments, the moveable member 130 can be pivotably detached from the body 105, thereby exposing the moveable thermal member 120 in the first position. A user can access the moveable thermal member 120 via the aperture 115 disposed in, on, or about the body 105. In one or more embodiments, the user can slide or otherwise displace the moveable thermal member 120 from the first position to the second position as depicted in FIG. 5. After displacing the moveable thermal member 120 to the second position, the user can then access the one or more heat producing components 310 via the aperture 115.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A thermal protection system comprising: a body having a first surface and a second surface, at least one thermally conductive stationary thermal member disposed at least partially proximate the first surface, and at least one heat producing device disposed at least partially within the body; wherein an aperture defined by at least one exterior edge penetrates both the body and the stationary thermal member; wherein at least a portion of the at least one heat producing device is disposed proximate the aperture; a thermally conductive moveable thermal member reversibly translatable between a first position and a second position, disposed proximate at least a portion of the stationary thermal member; wherein the moveable thermal member is disposed proximate the aperture and the at least one heat producing device when in the first position; wherein a first portion of the moveable thermal member overlaps the stationary thermal member in the first position; wherein when the moveable thermal member overlaps the stationary thermal member in the first position, heat transferred from the at least one heat producing device to the stationary thermal member travels through the moveable thermal member to the stationary thermal member via the first portion of the moveable thermal member; and wherein the moveable thermal member is disposed distal to the aperture and the at least one heat producing device when in the second position.

2. The system of claim 1, further comprising:
a moveable member corresponding in shape and size to the aperture in detachably attached to the body using at least one fastener.

3. The system of claim 2, wherein the moveable member comprises a planar member having a plurality of external edges;
wherein the moveable member is hingedly attached to the body along at least a portion of at least one of the plurality of external edges; and
wherein the at least one fastener is selected from the group of fasteners consisting of: a slide latch, a threaded fastener, and a quarter-turn quick release fastener.

4. The system of claim 1, wherein the body comprises at least a portion of an enclosure housing an electronic device; and
wherein the heat producing device is selected from the group of heat producing devices consisting of: a memory module; a processor; a semiconductor storage device; and a magnetic storage device.

5. The system of claim 1, wherein the moveable thermal member comprises a planar member having a greater in-plane thermal conductivity than thru-plane thermal conductivity.

6. The system of claim 1, wherein the moveable thermal member comprises a planar graphite-containing member having an in-plane thermal conductivity of at least about 100 W/m-K or more and a through-plane thermal conductivity of about 100 W/m-K or less.

7. The system of claim 1, wherein the stationary thermal member is composed of a material selected from the group of materials consisting of: a carbon-containing material, a copper-containing material, and an aluminum-containing material.

8. The system of claim 1, wherein the moveable thermal member is slideably attached to the stationary thermal member using at least one guide.

9. The system of claim 1, wherein the first portion of the moveable thermal member overlapping the stationary thermal member when in the first position comprises at least 25% of the total surface area of the moveable thermal member disposed proximate the stationary thermal member.

10. A thermal protection system comprising: a body having a body aperture passing therethrough and having at least one heat producing device proximate the body aperture disposed therein; a thermally conductive stationary thermal member at least partially disposed proximate the body, the stationary thermal member having a thermal member aperture coincident with the body aperture passing therethrough; and a thermally conductive moveable thermal member reversibly translatable between a first position and a second position; wherein, when in the first position, the moveable thermal member is disposed proximate the body and thermal member apertures and the at least one heat producing device; wherein, when in the first position, a first portion of the moveable thermal member overlaps the stationary thermal member by at least 25% of the surface area of the moveable thermal member disposed proximate the stationary thermal member; wherein when the moveable thermal member overlaps the stationary thermal member in the first position, heat transferred from the at least one heat producing device to the stationary thermal member travels through the moveable thermal member to the stationary thermal member via the first portion of the moveable thermal member; and wherein, when in the second position, the moveable thermal member is disposed distal to the body and thermal member apertures and the at least one heat producing device.

11. The system of claim 10, further comprising: a moveable member corresponding in shape and size to the body and thermal member apertures is detachably attached to the body using at least one fastener.

12. The system of claim 11, wherein the moveable member comprises a planar member having a plurality of external edges;
wherein the moveable member is hingedly attached to the body along at least a portion of at least one of the plurality of external edges; and
wherein the at least one fastener is selected from the group of fasteners consisting of: a slide latch, a threaded fastener, and a quarter-turn quick release fastener.

13. The system of claim 10, wherein the body comprises at least a portion of an enclosure housing an electronic device; and
wherein the heat producing device is selected from the group of heat producing devices consisting of: a memory module; a processor; a semiconductor storage device; and a magnetic storage device.

14. The system of claim 10, wherein the moveable thermal member comprises a planar member having a greater in-plane thermal conductivity than thru-plane thermal conductivity.

15. The system of claim 10, wherein the moveable thermal member comprises a planar graphite-containing member having an in-plane thermal conductivity of at least about 100 W/m-K or more and a through-plane thermal conductivity of about 100 W/m-K or less.

16. The system of claim 10, wherein the stationary thermal member is composed of a material selected from the group of materials consisting of: a graphite-containing material, a copper-containing material, and an aluminum-containing material.

17. A method for thermal protection comprising: at least partially disposing a thermally conductive stationary thermal member proximate a body having a first surface and a second surface, the stationary thermal member disposed at least partially proximate the first surface; forming an aperture defined by at least one exterior edge, the aperture penetrating both the body and the stationary thermal member in a coincident location; at least partially disposing at least one heat producing device within the body, proximate the aperture; attaching a thermally conductive moveable thermal member to at least a portion of the stationary thermal member, the moveable thermal member reversibly translatable between a first position and a second position; wherein the moveable thermal member is disposed proximate the aperture and the at least one heat producing device when in the first position; and wherein the moveable thermal member is disposed distal to the aperture and the at least one heat producing device when in the second position; overlapping at least a portion of the stationary thermal member with a first portion of the moveable thermal member, when the moveable thermal member is in the first position; moving the movable thermal member to the first position to heat from the at least one heat producing device to the moveable thermal member and, and from the moveable thermal member to the stationary thermal member via the first portion of the moveable thermal member; and moving the moveable thermal member to the second position to provide access to the at least one heat producing device disposed at least partially within the body.

18. The method of claim 17, further comprising: rotatably attaching proximate the at least one exterior edge of the aperture a moveable member, the moveable member comprising a planar member having a plurality of external edges, and corresponding in shape and size to the aperture, to the body using at least one fastener; wherein the moveable member is rotatably attached to the body using a hinge disposed along at least a portion of at least one of the plurality external edges of the moveable member; and wherein the at least one fastener is selected from the group of fasteners consisting of: a slide latch, a threaded fastener, and a quarter-turn quick release fastener; rotating the moveable member to a first position to prevent access to the moveable thermal member; and rotating the moveable member to a second position to provide access to the moveable thermal member.

19. The method of claim 17, wherein overlapping the stationary thermal member with the first portion of the moveable thermal member comprises overlapping the stationary thermal member with 25% or more of the total surface area of a surface of the moveable thermal member disposed proximate the stationary thermal member.

* * * * *

UNITED STATES PATENT AND TRADEMARK OFFICE
CERTIFICATE OF CORRECTION

| | | |
|---|---|---|
| PATENT NO. | : 7,903,418 B2 | Page 1 of 1 |
| APPLICATION NO. | : 12/427487 | |
| DATED | : March 8, 2011 | |
| INVENTOR(S) | : Mark S Tracy et al. | |

It is certified that error appears in the above-identified patent and that said Letters Patent is hereby corrected as shown below:

In column 11, line 52, in Claim 5, delete "thru-plane" and insert -- through-plane --, therefor.

In column 12, line 51, in Claim 14, delete "thru-plane" and insert -- through-plane --, therefor.

In column 13, line 18, in Claim 17, after "and," delete "and".

Signed and Sealed this
Eighteenth Day of October, 2011

David J. Kappos
*Director of the United States Patent and Trademark Office*